United States Patent [19]

Meyers

[11] E Patent Number: Re. 32,142

[45] Reissued Date of Patent: May 13, 1986

[54] METHOD AND APPARATUS FOR MAKING CARBONATED BEVERAGES

[76] Inventor: Louis B. Meyers, 3507 Oaks Way, Pompano Beach, Fla. 33060

[21] Appl. No.: 736,662

[22] Filed: May 22, 1985

Related U.S. Patent Documents

Reissue of:

[64] Patent No.: 4,481,986
Issued: Nov. 13, 1984
Appl. No.: 417,225
Filed: Sep. 13, 1982

[51] Int. Cl.[4] ..... C02D 1/00; B01F 3/04

[52] U.S. Cl. ..... 141/4; 261/DIG. 7; 141/113; 141/351; 141/325; 99/323.2

[58] Field of Search ..... 141/4, 6, 14–17, 141/21, 22, 113, 311, 323–325, 346, 351, 357, 369; 99/375, 323.1, 323.2; 261/DIG. 7; 426/477, 312, 316, 397; 215/11 B, 307, 311; 222/85

[56] References Cited

U.S. PATENT DOCUMENTS

| | | | |
|---|---|---|---|
| 994,260 | 6/1911 | Kennedy | 141/14 |
| 2,705,578 | 4/1955 | Burns | 141/17 |
| 3,307,595 | 3/1967 | Berning et al. | 141/311 |
| 3,953,550 | 4/1976 | Gilbey | 261/DIG. 7 X |
| 3,986,535 | 10/1976 | Meckstroth | 141/113 |
| 4,316,409 | 2/1982 | Adams et al. | 261/DIG. 7 X |

FOREIGN PATENT DOCUMENTS

| | | | |
|---|---|---|---|
| 3011106 | 11/1980 | Fed. Rep. of Germany | 426/477 |
| 824853 | 2/1938 | France | 261/DIG. 7 |
| 1468469 | 3/1977 | United Kingdom | 261/DIG. 7 |
| 2059791 | 4/1981 | United Kingdom . | |
| 2093359 | 9/1982 | United Kingdom | 261/DIG. 7 |

*Primary Examiner*—Stephen Marcus
*Assistant Examiner*—Ernest G. Cusick
*Attorney, Agent, or Firm*—Bauer & Amer

[57] ABSTRACT

A home portable tabletop carbonated beverage making apparatus and method of making carbonated beverages utilizing a pressurized source of gas, as carbon dioxide, to carbonate a container of liquid by causing the liquid to agitate and to flow within the container while the gas is being supplied to it and vented to escape from it so that the liquid presents changing surfaces to the gas to effect substantial saturation of the liquid with the gas to enhance its carbonation.

15 Claims, 8 Drawing Figures

METHOD AND APPARATUS FOR MAKING CARBONATED BEVERAGES

Matter enclosed in heavy brackets [ ] appears in the original patent but forms no part of this reissue specification; matter printed in italics indicates the additions made by reissue.

BACKGROUND OF THE INVENTION

The invention relates to a method and apparatus for carbonating liquids, and more particularly, for use as a soda or other beverage maker that may be used in the home as a small tabletop appliance.

DESCRIPTION OF THE PRIOR ART

At present, carbonated beverages are made in large apparatuses of the general nature as disclosed in U.S. Pat. No. 2,502,603 to Tanner. Different beverages, including sodas, are dispensed by combining the carbonated liquid mixed with a desired syrup or taste enhancing ingredient. The carbonator is generally a container having a supply of pressurized gas, more conventionally, carbon dioxide, that is mounted in the apparatus to dispense or supply its gas to the liquid contained in a beverage bottle. The apparatus relies upon the strong pressure and forceful flow of the carbon dioxide gas that is introduced into the liquid container to impinge upon and carbonate the liquid therein and for mixture with the desired syrup and other ingredients when the same are included with the liquid. If the gas, liquid and syrup do not become fully intermixed, the result is a flat, tasteless, sweet, partially carbonated liquid that lacks the true essence and taste characteristics of a soda or enticing beverage.

U.S. Pat. No. 3,953,550, to Gilbey, suggests the carbonation of liquids that may include other than water, and relies on the pressure of the carbon dioxide gas mixing with the liquid to produce a desired carbonated beverage.

Other patents which teach the use of failure prone mechanisms for stirring, agitating, rotating and/or vibrating the liquid for improving the mixture of the liquid and the gas and for the possible further enhancement of the saturation of the liquid with the gas are as follows:

| U.S. Pat. No. | Inventor |
|---|---|
| 1,336,720 | Baulig |
| 1,392,345 | Lowe |
| 2,556,038 | Kollsman |
| 2,661,938 | Kuentzel |
| 3,206,172 | Gaska et al |
| 3,539,156 | Wananinger et al |

German Pat. No. 208,513 of 4/1909 Stiles

SUMMARY OF THE INVENTION

The present invention recognizes that a superior soda or carbonated beverage is produced when its liquid and ingredients are substantially fully saturated and intermixed with gas, as carbon dioxide. Thus, it is known that as a beverage becomes more fully carbonated, its taste characteristics are improved. Recognizing this phenomenon, the invention teaches a method and apparatus for achieving substantially full saturation of a beverage liquid by physically causing the liquid to agitate and flow within its container. This is accomplished simply by deliberately selectively venting the container to provide an escape of a predetermined amount of the gas therefrom. As the gas flows towards the vent to escape from the container, it moves rapidly and violently through the liquid, causing the liquid to agitate. This agitating flow causes the liquid to present changing surfaces to the gas so that the liquid surfaces and the gas come into full mixing contact with each other. The result is a substantially fully saturated beverage liquid of enhances carbonation and taste characteristics.

The above description, as well as further objects, features and advantages of the present invention, will be more fully appreciated by reference to the following detailed description of a presently preferred, but nonetheless illustrative embodiment in accordance with the present invention when taken in conjunction with the accompanying drawings wherein.

DESCRIPTION OF THE INVENTION

Figure 1:
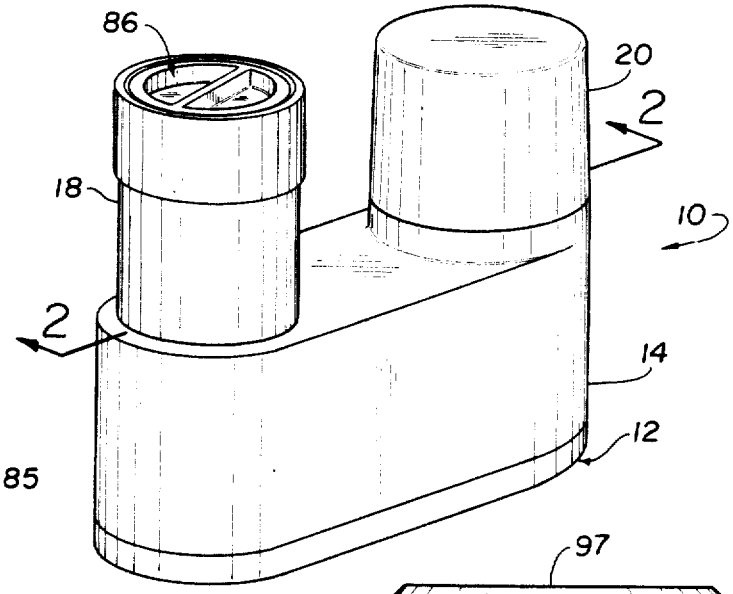
FIG. 1 is a perspective view of a beverage making apparatus constructed according to the teaching and operated in accordance with the method of the present invention.

Referring to the drawings, FIG. 1 shows the beverage making apparatus constructed in accordance with the teaching and the method of the present invention to be extremely compact and simple in detail. The apparatus thereshown is generally identified by the numeral 10. The details illustrated in FIG. 1 are not intended to be limiting upon the scope of the present invention. Rather they are merely illustrated for the purpose of enabling a fuller understanding and recognition of how simple and compact the apparatus of the present invention may be made for use as a tabletop appliance.

Generally, the apparatus 10 can include a base 12 on which there is conveniently mounted a decorative enclosing housing 14 that may be provided with a soda bottle-receiving opening 16. FIG. 1 illustrates a decoratively designed soda bottle generally identified as 18 constructed in accordance with the present invention and imported in its operative position. As the description proceeds, it will be recognized that the soda bottle 18 illustrated in FIG. 1 is mounted in its inverted position. That is to say, the soda bottle in its present illustration in FIG. 1 displays the base of the soda bottle extending upwards from the housing 14 while the pouring spout or end of the soda bottle that is normally closed by a removable cap, is mounted down within the housing 14, and therefore not seen.

The housing 10 may also include a removable decorative cover 20 which attractively encloses a gas supply container enclosing a gas, as carbon dioxide, under pressure therewithin to be dispensed therefrom to the soda bottle 18 by way of connecting fluid passage means in the form of conduits provided in the base 12 as will become clearer in reference to other figures of the drawings. Let it suffice to note that the pressurized gas container need not necessarily be enclosed within the decorative cover 20. Rather, in actual practice, it is foreseeable that the container may be so designed as to be supported by the base to project upwardly from the housing 14 in such a manner that, by itself, the same may effect an attractive appearance. When this is done, the cover 20 may be dispensed with.

Figure 2:
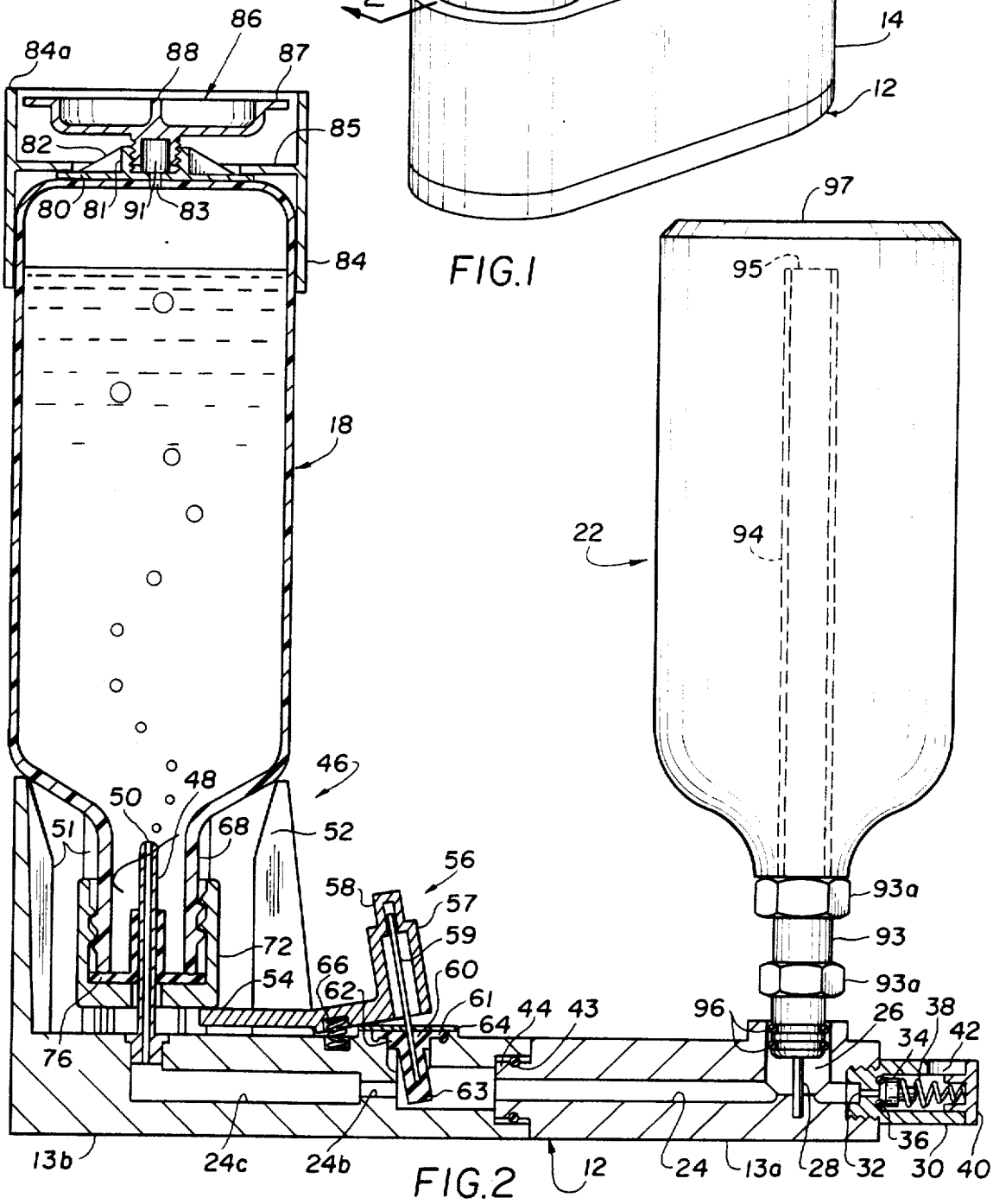
FIG. 2 is a vertical cross-section taken substantially along lines 2—2 of FIG. 1 with a portion of the outer housing removed for the convenience of explanation.
Figure 3:
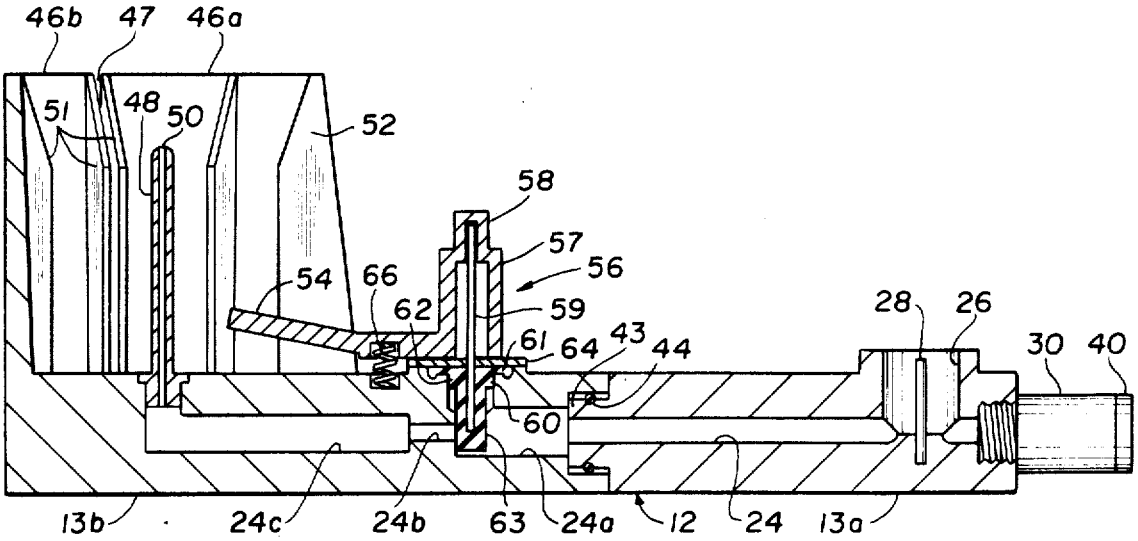
FIG. 3 is a cross-sectional view of the supporting base taken substantially along the lines 2—2 of FIG. 1.
Figure 4:
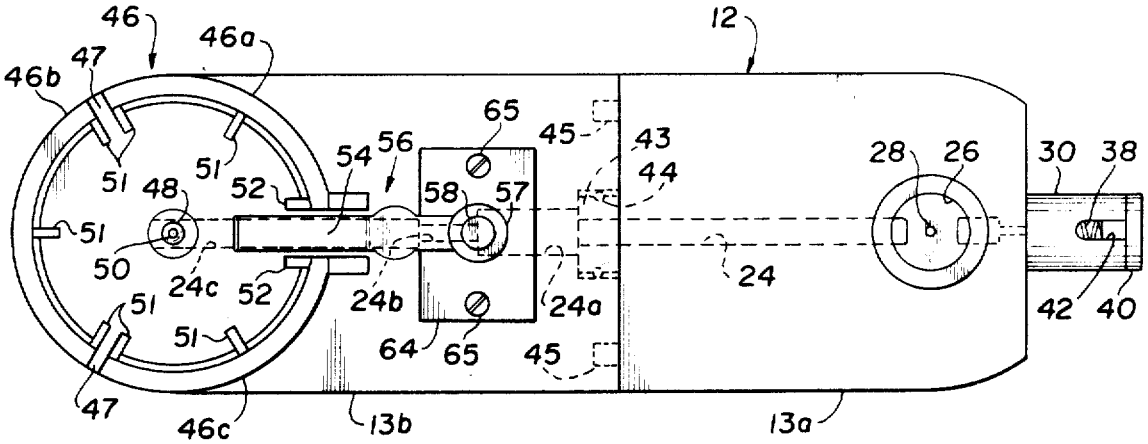
FIG. 4 is a top view of the supporting base.

The supporting base 12 is illustrated in greater detail in FIGS. 2, 3 and 4 wherein it will be noted that the same is conveniently shown in substantially rectangular form. The shape of the base 12 does not constitute a limitation upon the scope of the invention. The illustration here shown may conform substantially to that of the decorative and attractive illustration shown in FIG. 1. Obviously, the base may be of any desired shape. However, the same does provide a support for mounting both the soda bottle 18 and the gas supply container or bottle generally identified by the numeral 22 (see FIG. 2), which contains a supply of gas under pressure.

The base 12 is provided with the connecting gas or fluid supply passage or conduit 24 that extends from the upwardly directed receiving socket 26. Socket 26 is adapted to receive therein and to mount in an inverted position the gas supply container 22 as is more clearly illustrated in FIG. 2, the details of which will be discussed later. Positioned within the gas container mounting socket 26 and projecting upwardly thereinto from the bottom thereof for engagement with a conventional valve structure (not shown) included within the neck of the gas bottle 22, is a valve release pin 28.

The socket 26 forms a continuation of the connecting passage 24 that flows gas to a pressure release valve having a housing 30 removably threaded in the passage 24 at a reduced threaded neck portion that includes a continuing opening 32. This affords the passage of gas from the conduit 24 into the housing 30. The opening 32 is normally closed by a removable T-shaped closure valve 34 that is normally spring biased closed against the sealing O-ring 36. The closure spring 38 is positionally seated with a closure member 40 that completes the pressure release valve 30.

When pressure builds up within the passage 24 and within the socket 26, in the event the pressure is no otherwise relieved, the valve 34 will be caused to move away from the seal 36 against the force of its spring 38 to permit the gas to escape from about the space between the outer periphery of valve 34 and the body 30. The escaping gas flows outwardly through a slotted opening 42 to exhaust therefrom to the atmosphere.

For convenience, the base 12 may be made either in one or more parts. However, for ease of illustration, the same is shown to be made in two parts, 13a and 13b. The part 13a is provided with a joining projection 43 that has positioned about it a sealing O-ring 44. The part 13b is provided with a similarly shaped opening to receive the projection 43 therein so that the connecting fluid line 24 may be extended into the adjacent joined part 13b. One of a plurality of aligning pins 45 may be provided to aid in the alignment and the engagement of the two parts 13a and 13b together. For convenience, the connecting portion of the passage is identified by the numeral 24a. However, it will be noted that the line 24a is of slightly larger diameter than that of the main supply line 24 for a reason to be described. The connecting gas conduit extends beyond the larger portion 24a to a narrower conduit 24b which communicates with a continuation 24c.

The gas supply line 24 connects the socket 26 of the gas supply container or bottle 22 with a socket 46 that is adapted to receive a liquid container or beverage pouring bottle to be described. Facing upward into the socket 46 is a gas dispensing supply nozzle 48 that has a through opening or passageway 50 that is in constant fluid communication with the connecting gas supply line 24 at its bottom that is mounted within the part 13b of the base 12. The exposed projecting end of the gas supply nozzle 48 is smoothly rounded as is illustrated more clearly in FIG. 3.

The liquid or soda bottle receiving socket 46 projects upwardly from the base 12 and more particularly from the part 13b thereof as may be seen more clearly in FIG. 3. The socket 46 is generally circular in shape to conform to that of the bottle 18. The socket is divided into a plurality of upstanding of parts 46a, b and c, each of which is spaced slightly from the next adjacent part by a slot 47.

Each socket part 46a, b and c is provided with a plurality of elongated fingers 51 that taper outwardly and upwardly at their upper ends so as to form an enlarged entrance for the easy accurate reception and guided insertion of the liquid container or beverage bottle 18 downward and into proper supported engagement therewith along the length of the fingers 51. Two of the adjacent fingers 52 of the socket parts 46a and 46c are spaced apart from each other an arcuate distance greater than the remaining fingers 51 so as to accommodate the lever arm 54 for operating a control valve generally identified by the numeral 56.

The control valve 56 comprises the operating lever arm 54 that extends laterally from a substantially circular body 57 that has pressed into its upper end 58 a control shaft 59. The control shaft 59 extends downward from its connection with the body 58 into the interior of the part 13b of the base 12. It is formed integral with a resilient or elastomeric member 60, having an upper enlarged circular flange 61 that fits into a conformingly shaped circular groove in the top of the part 13b of the base 12. An enlarged positioning seat 62 extends downwardly from the flange 61 to fit snugly and conformingly within a circular opening provided for its immovable support in the base part 13b.

Since the member 60 is formed of unitary construction, it has a downwardly extending narrower valve portion 63 that is sufficiently large in diameter to close the adjacent surface opening of the relatively small diameter connecting passageway 24b. The whole assembly 56 is secured in its normally closed position by a hold down plate 64 that may be conveniently screwed or otherwise secured to the top of the base part 13b by the screws 65 as is seen more clearly in FIG. 4.

The control valve 56 is shown in FIGS. 3 and 4 retained in its normally closed upright position with its valve end 63 in closing relationship against the adjacent open end surface of the connecting smaller passageway 24b as is shown in FIG. 3. The control valve is further aided to assume its upright normally closed position by the assistance of a spring 66 mounted between its operating lever arm 54 and the top surface of the base part 13b. In practice, and as will become more apparent as the description proceeds, it will be seen that the valve 56 is further urged into its normally closed position by the pressure of the larger volume gas trapped within the connecting line 24 and bearing against the valve end 63 that is positioned within the enlarged passageway 24a.

The liquid container or beverage pouring bottle generally identified by the numeral 18 is more fully illustrated in FIGS. 2, 5, 6, 7 and 8. The bottle may be made of a pressure resistant plastic material that has a relatively thin rounded wall construction. The bottle 18 is provided at its upper end with a narrowed neck 68 that is threaded at 70 to receive a closure cap 72 that is provided with a complementary thread 73 on its interior surface. The bottle is provided with a pouring spout or opening 74 by way of which liquid, such as water, syrup and the like may be introduced into the interior of the bottle and the carbonated liquid may be poured therefrom.

The closure cap 72 is adapted to fluid-tightly close the pouring spout or opening 74. This fluid-tight closure is effected by the use of an elastomeric or yieldable valve seal member that has an enlarged flange 76 that is formed integral with an extension valve portion 77. The valve portion 77 is radially elongated and generally oval in shape and includes a normally tightly closed through slot 78, the side walls of which are in fluid-tight engagement with each other. When the walls of the slot 78 are closed, they prevent the passage of fluids therebetween. Hence, they form a fluid-tight valve seal until the walls are separated from each other by some means that is physically inserted between them and into the bottle interior. In the present invention, the walls are intended to be separated by the pasasge of a gas supply pin 48 extending upwardly through them. To enable this to be accomplished, the top of the closure cap 72 is provided with a through opening 79 that is aligned with the slot 78 of the valve 76.

The valve seal 76 is adapted to be fixedly mounted within the closure cap 72 with the enlarged flange 76 thereof pressed tightly against the interior of the top end of the closure cap 72 with its slow 78 positioned in alignment with the opening 79. When assembled, the valve seal and closure cap 72 from a unitary closure structure. Thus, when the cap 72 is applied to the threads 70 of the neck 68 of the bottle 18 the upper end of the spout 74 is fluid tightly engaged by the smooth enlarged facing surface of the flange 76.

The base of the liquid containing soda bottle 18 is rounded throughout so as to more evenly distribute the forces of the pressurized gas entering the same. This enables the thin wall of the liquid container 18 to resist and to adequately and safely contain the pressures of the gas supplied thereto and contained therein with the liquid, so as to constantly retain the liquid under pressure.

Mounted to the outer surface of the base of the liquid container or soda bottle 18 is a vent plate 80. The vent plate 80 may be permanently adhered to the outer surface of the base of the container 18 by heat-welding or by the use of an adhesive or glue (not shown). The vent plate 80 has a boss-like extension from the side thereof extending away from the base of the container 18. The boss 81 may be formed integral with the plate 80 and is reinforced by a plurality of spoke-like ribs 82 connected between the boss and the plate. The interior of the boss 81 is hollow and provided with a threaded surface along the full length thereof while along the central axis of the boss and extending through the plate 80 is a vent or escape opening 83 that is aligned with a similar size and shape vent or escape opening in the base of the container or bottle 18.

Permanently affixed to the exterior lower surface of the container or bottle 18 is a base sleeve 84 that is substantially circular in shape to conform snugly to the lower outer surface portion of the container or bottle 18 to be secured thereto either by heat-welding or by the use of an adhesive or glue. The sleeve 84 becomes a unitary and integral part of the base portion of the liquid container or soda bottle 18 and functions effectively as its bottom. The sleeve 84 is provided with a radially inwardly directed circumferential seating flange 85 that abuts against the exposed outer surface of the vent plate 80 after the vent plate 80 is affixed to and as an integral part of the base surface of the liquid container or soda bottle 18. The flange 85 therefore overlays and presses against the vent plate 80 to hold the same positioned against the base of the container 18 after the sleeve 84 is affixed securely to the container as is illustrated in FIG. 2 and as described above.

Figure 5:
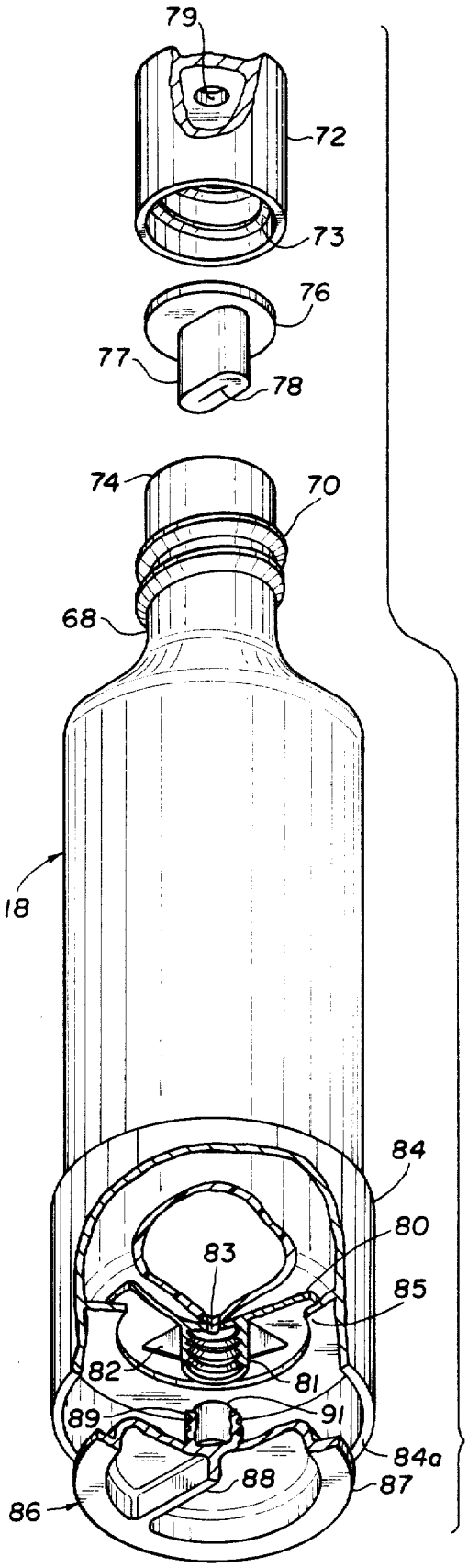
FIG. 5 is an expanded view of the details of the beverage bottle shown in perspective with portions thereof broken away so that the details may be more clearly illustrated.
Figure 6:
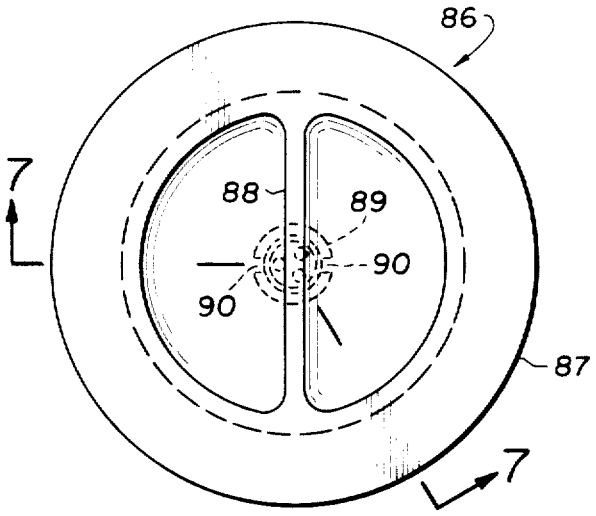
FIG. 6 is a plan view of the valve for venting the bottom of the beverage bottle.

The exposed rim 84a of the flange 84 extends well beyond the base of the liquid container or soda bottle 18 so as to serve the function of the supporting base thereof. Hence, when the bottle is assembled in its upright position as illustrated in FIG. 5, the same is now able to be supported on its peripheral supporting base or bottom rim 84a. The lengthwise distance between the supporting rim 84a and the radially directed seating flange 85 is sufficient to accommodate a selectively operable valve cap generally identified by the numeral 86 and illustrated more clearly in FIGS. 6, 7 and 8 as manually operable. As the description proceeds, it will become apparent that it is within the scope of the invention that the valve 86 may be operated automatically.

In practice, the valve cap 86 is molded as one piece or of unitary construction. It comprises a radially spaced circular flange 87. In the interior of the radial space provided by the flange is a diametrically directed unitarily connected finger grip 88 which divides the open area of the circle formed by the marginal circular flange 87. This enables the accommodation of the fingers of a hand therein to permit the fingers to more easily grip the finger grip 88 on the opposite sides thereof.

Projecting downward from and forming an integral part of the valve cap 86 is a boss that is threaded at its outer surface 89 with a thread that mates with the interior thread of the boss 81 of the vent plate 80. This facilitates the valve cap 86 to be threadedly rotated within and relative to the gas escape vent opening 83 that is provided in the vent plate 80 and in the base of the liquid container or soda bottle 18. To provide for the escape of gas from between the mating threads 89 of the valve cap 86 and the boss 81, either the projection on which the threads 89 are formed, or the interior of the boss 81, may have a plurality of venting slots 90. For convenience of illustration the venting slots 90 are shown to be provided along the length of the threads 89 of the boss of the valve cap 86. The specific number of shape of the slots may be varied depending on the results desired without departing from the teaching of the present invention. In the present illustration of FIGS. 7 and 8, two such vent slots 90 are illustrated located in diametrically opposed relationship.

Figure 7:
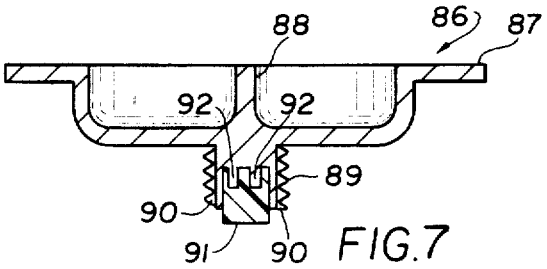
FIG. 7 is a cross-section of FIG. 6 taken along lines 7—7.

To enable the valve cop 86 to perform its function, it is provided with a rubber valve seal 91 that is illustrated more clearly in FIG. 7. The valve seal 91 seats within an interior socket provided in the boss of the valve cap 86 and has a substantial exposed length thereof extending therebeyond for engagement with that surface of the vent plate 80 that surrounds the gas vent or escape opening 83. Consequently, when the valve cap 86 is threaded tightly down into the boss 81, the exposed end of the valve seal element 91 will seat tightly against the facing surface of the vent plate 80 to completely fluid-tightly close the vent gas escape opening 83 provided therein.

Figure 8:
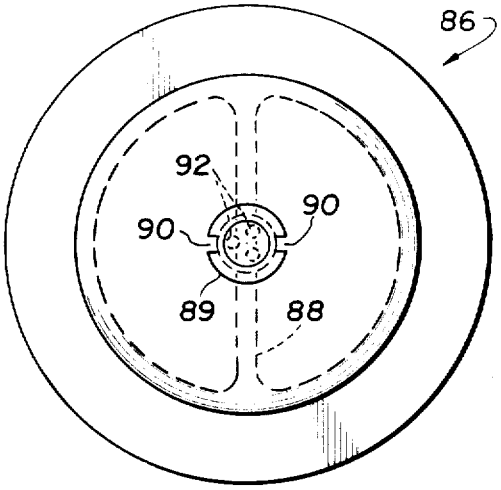
FIG. 8 is a bottom view of FIG. 7.

To prevent any possible relative rotation of the valve seal 91 within and with respect to its seating socket defined in the valve cap 86, the same may be glued therein. In practice it has been to provide a plurality of locating pins 92 formed integral with the socket and extending lengthwise into locking and anti-rotative engagement with the valve seal 91. Although any convenient number of such pins may be provided, three are illustrated in FIG. 8.

The gas supply container or bottle 22 is generally of conventional construction. Within its neck 93 is a conventional fluid pressure release valve (not shown) that is conventionally supported in position by the cooperation of the two hexagonal nuts 93a. While retaining the pressure release valve within the neck 92 the nuts 93a also mount therewithin a siphon tube 94. The open end 95 of the tube faces and is spaced a short distance from the bottom of the bottle 22 whiqe the opposite end of the tube 94 is connected directly with the pressure release valve in the neck 93 to direct the supply of gas to the same and for dispensing therefrom. The topmost outer portion of the bottle 22 is provided with a double valve seal in the form of O-rings 96.

Prior to use of the present apparatus, the soda bottle or liquid container 18, resting on its bottom supporting rim 84a, is filled with a liquid, as water, and/or taste-enhancing syrups and other desired ingredients. This is accomplished by unscrewing the cap 72 from the threads 70 of the neck of the bottle 18 so as to expose the pouring spout opening 74 thereof. With the opening 74 uncovered, any desired one or combination of liquids and/or ingredients may be introduced into the container or soda bottle. When the desired amount and contents of the ingredients are introduced into the bottle 18, the closure cap 72 is threaded fluid-tightly thereover to close the same. The closure is effected by the engagement of the radially directed flange 76 against the exposed end 75 of the opening of the bottle.

The gas bottle 22, having already been supplied with a quantity of pressurized gas enclosed therewithin, normally may be rested on any convenient surface on its base surface 97. When it is desired to carbonate the liquid and ingredients contained within the soda bottle 18, the supply of gas 22 is connected with and mounted in the apparatus 10 by inverting the bottle 22 so that its normally closed pressure release valve within the neck 92 may be opened to dispense the gas therefrom. This is accomplished simply by inverting the bottle 22 and inserting the uppermost end of the neck 93 into the receiving socket 26. During such insertion the seals 96 on the end of the bottle 22 are pressed into sealing engagement with the circular internal wall of the socket 26 to form a fluid-tight seal therebetween.

During the downward upside-down insertion of the gas bottle into the socket 26 the valve release pin 28 mounted within the socket will cause the valve within the neck 92 to open as the bottle is progressively lowered into the socket 26. When this occurs, gas will escape from the bottle 22 downwardly into the base member 12 to flow into the connecting gas supply passageway 24. Although the control valve 56 is normally closed such that its valve end 63 closes the passageway 24b, the addition of the pressurized gas into the connecting passageway 24 acts upon the valve end 63 so as to supplement the normal closing urging action of the spring 66 thereagainst and more positively retains the end of the valve 63, closed against connecting passageway 24b.

In the event there is an excessive build-up of gas pressure within the connecting line 24, the gas is also transmitted to the pressure release valve 30 that is connected at the end of the line 24 on the opposite side of the pressurized gas supply 22. Thus, if there is an excess of pressure in the connecting line 24, gas will be permitted to escape therefrom by causing the T-shaped valve 34 to unseat from the O-rings 36 to permit the escape of gas from the line 24 by way of the exhaust opening 42 in the valve member 30.

However, in the event release of the pressure release valve 30 fails to lower the pressure in the connecting line 24 to the desired amount, there will be a back-up of pressure beneath the end of the gas supply container 22 within the socket 26. This excess of pressure will act against the surface of the lower end of the container 22 to cause the same to rise within the socket 26. When the container 22 rises, the pin 28 releases the pressure release valve within the neck 93 to stop the flow of gas therefrom. At the same time, its upward movement releases the seal the O-rings 96 made with the socket 26 to permit the gas to escape therefrom until the pressure is reduced. When the pressure of the gas in the connectine line 24 reaches the predetermined value for proper use and operation, the weight of the gas supply container 22 will be sufficient to cause it to fall back again into the socket 26 and against the release pin 28 so as to restart the release of gas into line 24.

By providing the siphon tube 94 within the supply container 22 it will be recognized that only gas rising to the base 97 of the inverted container 22 will be siphoned out therefrom by way of the pressure release valve within the neck 93 thereof. Any liquid that may accumulate within the gas bottle, as is usually present in carbon dioxide supply containers, will fall downward and into and about the neck of the container 22 and about the lower end of the siphon tube 95 when the container is in its inverted position as is shown in FIG. 2. By placement of the siphon tube in the manner as shown, when the container 22 is in the inverted position, none of the liquid that may accidentally be trapped within the container will escape therefrom through the siphon tube 95. Rather, all liquid in the container will be trapped therewithin and will not be dispensed into the connecting line 24.

After the liquid container or soda bottle 18 is filled with its desired liquid and/or other ingredients, it is normally supported on its base rim 84a of the sleeve 84. The valve cap 86 is normally threaded tightly into the boss 81 so that the gas escape vents 83 provided in both the plate 80 and the base of the container 18 are closed. The closure cap 72 is also closed as described.

The soda bottle 18 is now ready to be applied to the base 12 of the apparatus 10. The soda bottle 18 is inverted so that its closure cap 72 is inserted and pressed downward into the socket 46 of the base 12 between the fingers 51 and 52 thereof. It is guided to enter the socket by the upper tapered entranceway ends of such fingers that align the opening 79 in the closure cap 72 with the gas supply pin 48 and the opening 50 therein. Further downward movement of the soda bottle 18 into the socket 46 causes the closure cap 72 to penetrate deeper downward and progressively along the gas supply pin 48 until such time as the leading end of the closure cap 72 comes into engagement with the operating lever arm 54 of the control valve 56.

However, by the time the cap 72 comes into operating contact with the lever arm 54, the gas supply pin 48 and its open end 50 have already had the opportunity to pass progressively and completely through the opening 79 in the cap and completely through the slot 78 in valve portion 77 of the valve 76 that is mounted within the cap 72. When this occurs the walls of the valve slot 78 close and hug the pin 48 fluid-tightly to prevent the loss of fluid therebetween. Continued downward movement of the soda bottle into the socket 46, causes the operating lever arm 54 to be pressed downwardly against the normal upward urging of the spring 64 and the closing force of the pressurized gas in the line 24a of the upstream side of the valve end 63. This causes the valve 56 to pivot into its open position as is shown in FIG. 2. When the soda bottle reaches this point of support it is now securely mounted and retained within the socket 46 in its inverted position.

Once the control valve 56 is operated open by the inserted bottle 18, it holds the valve open, the pressurized gas that has already been supplied to the connecting line 24 and that is present therewithin, seeks an escape therefrom by way of the gas supply pins 48, which directs its flow into the interior of the soda bottle 18. There the gas tends to expand rapidly, at least initially, to comingle and intermix with the liquid and other ingredients within the soda bottle. In the past, this intermixing was relied upon as sufficient to produce a desirable beverage. The present invention recognizes the shortcomings of the prior art in their reliance upon such substantially static or non-dynamic intermixture with the liquid in the container or soda bottle 18. As a consequence, the present invention provides for the turbulent, agitation and flow of the contents in the soda bottle by the incoming highly pressurized gas.

To accomplish this, the valve cap 86 is selectively operated. Although the cap may be operated automatically, to more fully enable the teaching of the present invention the same is shown to be manually operable. That is to say, the user of the apparatus merely rotates the valve cap 86 by grasping the finger grip 88 and turning the same counter-clockwise within the boss 81 of the vent plate 80. This causes the valve seal 91 therewithin to rise out of engagement with the surface of the vent plate 80 that surrounds the gas vent escape opening 83. As the pressurized gas rushes up through the opening 83 it escapes to the surrounding atmosphere by way of the venting slots 90 provided along the length of the threads 89.

By deliberately permitting the escape of the pressurized gas from the container 18 at a point that is remote or spaced from the inlet of the closure cap 72, the portion of the liquid in the container 18 therebetween is violently turbulated and agitated by the high pressurized gas in its rush to escape to the atmosphere by way of the valve cap 86. This causes the liquid and other ingredients in the bottle 18 to flow rapidly and change the surfaces that it presents to the escaping gas to more fully intermix with the gas so as to enable the gas to more completely come into saturating engagement with all the liquid and the other ingredients to more fully enhance their carbonation.

After a predetermined period of deliberate, selected escape of the gas from the container 18, the valve cap 86 is then rotated clockwise to close the gas escape vent opening 83 and to stop the further escape of gas from the container. This fluid-tightly encloses all of the ingredients and gas therewithin.

In the practice of the method of the present invention it will be recognized that when the gas enters the container 18 at its given pressure, the container becomes pressurized with such gas and achieves the pressure of the gas entering the same. However, by selectively causing the escape of the gas therefrom, the gas pressure in the container is permitted to drop and lower from that of the given pressure of the gas entering the same. Thus, when the valve cap 86 is closed to terminate the escape of the gas from the container 18, the container is now permitted to reestablish gas pressure therein that becomes equal to that of the pressure of the gas supply 22.

This places the liquid within the container under the same pressure as that of the gas supply 22. It will be clear to those who are skilled in this art that the escape of the pressurized gas from the container is permitted even while additional pressurized gas is being supplied to the container 18. As a matter of fact, even after the escape of gas from the container 18 is terminated, gas under pressure will continue to be supplied to the container to increase the gas pressure within the container so as to place the liquid and the ingredients therein under substantial pressure which thereby enhances their carbonation.

After a desired period of carbonization of the container 18 and the contents therewithin, the container may be removed from its socket 46 merely by lifting the same free of the gas supply pin 48. It will be clear that, by the very nature of the valve 76 within the cap 72, when the bottle 18 is progressively lifted from the socket, the walls of the slot 78 will progressively close so that the contents within the container are fluid-tightly retained therein once the container is lifted free of the pin. As the container is lifted free of the pin, it also is progressively lifted free of its engagement with the operating lever 54 of the control valve 56, thereby permitting the control valve 56 to close automatically. After the liquid and other ingredients contained within the soda bottle 18 have been carbonated to the desired extent and the soda bottle has been removed from its socket 46 in the base 12 of the apparatus, the sode bottle may then be placed on any desired tabletop or other surfaces supported at the rim 84a. When it is desired to pour the contents of the liquid therefrom, the closure cap 72 is removed from the threads 70 thereof. The uncapping of the neck 68 of the soda bottle 18 now permits the carbonated beverage therein to be poured therefrom through the pouring spout opening 74. After the desired amount of the carbonated beverage is poured from the container 18, the same may be recapped by returning the closure cap 72 to the threads 70 and rethreading the same tightly so that the flange 76 of the valve portion 77 engages against the upper rim end 75 to seal close the interior thereof and to contain the liquid in its enhanced carbonated form.

Even after the carbonated liquid container or soda bottle 18 is removed from its mounting socket 46, the gas supply bottle 22 may remain seatingly supported within its socket 26 and in engagement with the valve release pin 28 so as to keep open the valve and to cause the gas therein to be supplied under pressure to the connecting passageway 24 to be retained readily available therein between the pressure release valve 30 and the control valve 56. As long as the pressure release valve 56 is closed and the valve end 63 is in its valve closint position to prevent the escape of gas under pressure into the portion 24b, the gas is contained within the passageway 24 and is always available for continued use and supply to another soda bottle 18 that may be seated within the socket 46. When a new bottle is pressed downwardly therein to actuate open the operating lever arm 54, this once again permits the control valve 56 to supply gas to the new bottle and to the liquid and other ingredients therein so that the cycle of carbonization may be repeated all over again as previously described.

While there have been shown and described and pointed out the fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto. For example, references to fluids is intended to include liquids as well as gases.

What is claimed is:

1. In an apparatus for making carbonated beverages, a supply of gas under pressure, and a *portable* container of liquid having an inlet connected with said gas supply to receive the gas therefrom for carbonation and pressurization of the liquid, means on said container spaced from said inlet operable to vent the gas from said container *to the atmosphere* during the supply of the gas thereto so that as the gas vents from said container it agitates the liquid in said container to cause the liquid to change its surfaces presented to the supplied gas for more complete contact and saturation with the gas thereby to enhance the fuller carbonation of the liquid.

2. In an apparatus as in claim 1, said container vent means being selectively operable to vent the supply of gas from said container and to stop the venting of the gas from said container to enable the gas to apply a desired pressure to the liquid in said container.

3. In an apparatus as in claim 1, a control valve between said gas supply and container normally closing the supply of gas to said container and operable to open the supply of gas to said container upon engagement of said container with said control valve.

4. In an apparatus as in claim 3, said gas supply having a normally closed valve operable to open to permit the exhaust of the gas therefrom, and means supporting said gas supply to open said gas supply valve to exhaust gas to said container to urge closed said control valve.

5. In an apparatus as in claim 1, said liquid container having a pouring spout and a cap closing the same to retain the carbonated liquid therein under pressure, and valve means in said cap normally closed to fluid-tightly close said container and through which pressurized gas is supplied to the liquid in said container, said cap being removable from said spout to permit the carbonated liquid to be dispensed from said container.

6. In an apparatus as in claim 5, said valve means of said closure cap and said operable vent means being relatively spaced on said container so that the pressurized gas supplied to the container through said valve means must flow through at least a portion of the liquid before being vented from said container.

7. In an apparatus as in claim 1, means for supporting said gas supply and said liquid container inverted while the gas is supplied from said supply to said container, and means in said supply for enabling the selective exhaust of only pressurized gas therefrom.

8. A carbonated beverage making apparatus comprising a beverage bottle containing a liquid to be carbonated and having an opening through which liquid is poured therefrom, a container having a supply of carbonating pressurized gas, means supporting said bottle and container to provide for the supply of pressurized gas from said container in the liquid in said bottle to carbonate the same, vent means on said bottle spaced from said opening to provide for the escape of the pressurized gas from said bottle to enable the escaping gas to agitate the liquid by reason of the gas flowing therethrough and to mix with the liquid in said bottle before the gas escapes therefrom to enhance the fuller carbonation of the liquid, and said vent means being operable to stop the escape of the gas, and valve means to fluid-tightly close said liquid pouring opening to permit the supply therethrough of pressurized gas to the liquid in said bottle and operable to permit the liquid to be poured through said opening from said bottle and being spaced from said vent means to provide for the flow of the supplied gas through the liquid before escaping through said vent means.

9. In an apparatus as in claim 8, said valve means having a normally closed passage to fluid-tightly close said bottle interior and contain the liquid therein and operable to enable the insertion of a gas supply tube therethrough and into the interior of said bottle so that as the gas supply tube is removed from said passage said valve fluid-tightly closes progressively therebehind.

10. In an apparatus as in claim 9, said gas container having a releasable valve, a bottom and a siphon tube extending downwardly into said container toward said bottom.

11. In an apparatus as in claim 10, said supporting means including means for mounting said bottle and container inverted.

12. In an apparatus as in claim 11, said means for mounting said container inverted including means to release said valve so that when the gas rises to the bottom of said container and surrounds said siphon tube, the gas is dispensed through said siphon tube from said container to said bottle.

13. In an apparatus as in claim 11, said container mounting means including a fluid-tight seal with said inverted container that permits said container to rise in said seal to release its pressure to the atmosphere when the pressure of the gas dispensed therefrom exceeds a predetermined amount and to lower in said seal when the dispensed gas is at or below said predetermined amount.

14. In an apparatus as in claim 10, control valve means between said gas container and bottle normally closed and being operable open when such bottle is mounted inverted in said supporting means.

15. In an apparatus as in claim 14, means on said bottle and control valve means cooperable to open said control valve means when said bottle is mounted inverted in its mounting means.

* * * * *